United States Patent
Zhao et al.

(10) Patent No.: US 11,690,032 B2
(45) Date of Patent: Jun. 27, 2023

(54) SIGNAL SENDING AND RECEIVING METHOD, NETWORK DEVICE AND TERMINAL

(71) Applicant: DATANG MOBILE COMMUNICATIONS EQUIPMENT CO., LTD., Beijing (CN)

(72) Inventors: Zheng Zhao, Beijing (CN); Deshan Miao, Beijing (CN); Shaohui Sun, Beijing (CN); Shaoli Kang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/431,131

(22) PCT Filed: Feb. 14, 2020

(86) PCT No.: PCT/CN2020/075384
§ 371 (c)(1),
(2) Date: Aug. 13, 2021

(87) PCT Pub. No.: WO2020/164617
PCT Pub. Date: Aug. 20, 2020

(65) Prior Publication Data
US 2022/0150849 A1    May 12, 2022

(30) Foreign Application Priority Data
Feb. 15, 2019 (CN) .......................... 201910118061.0

(51) Int. Cl.
*H04W 56/00* (2009.01)
*H04L 5/00* (2006.01)
*H04L 27/26* (2006.01)

(52) U.S. Cl.
CPC .......... *H04W 56/001* (2013.01); *H04L 5/005* (2013.01); *H04L 5/0023* (2013.01); *H04L 27/2626* (2013.01)

(58) Field of Classification Search
CPC .. H04W 56/001; H04W 48/12; H04L 5/0023; H04L 27/22; H04L 27/261; H04L 27/216;
(Continued)

(56) References Cited

U.S. PATENT DOCUMENTS

2013/0064216 A1* 3/2013 Gao .................. H04L 5/0055
370/329
2013/0336279 A1* 12/2013 Kim ................... H04W 72/005
370/329
(Continued)

FOREIGN PATENT DOCUMENTS

CN      108270710 A     7/2018
CN      108307496 A     7/2018
(Continued)

OTHER PUBLICATIONS

Extended European Search Report for European Patent Application 20756400.6, dated Mar. 25, 2022.
(Continued)

*Primary Examiner* — Sophia Vlahos
(74) *Attorney, Agent, or Firm* — Ladas & Parry, LLP (57) ABSTRACT

This disclosure provides a signal sending method, a signal receiving method, a network device and a terminal. The signal sending method includes: determining a position and beam direction of a synchronization signal block SSB to be sent; sending the SSB according to the determined position and beam direction of the SSB.

8 Claims, 5 Drawing Sheets

(58) Field of Classification Search
CPC ............ H04L 27/26134; H04J 11/0073; H04J 11/0076; H04J 11/0069
See application file for complete search history.

(56) References Cited

U.S. PATENT DOCUMENTS

| | | | |
|---|---|---|---|
| 2016/0308637 A1* | 10/2016 | Frenne | H04L 5/0048 |
| 2018/0248642 A1 | 8/2018 | Si | |
| 2019/0052337 A1 | 2/2019 | Kwon et al. | |
| 2019/0058538 A1* | 2/2019 | Sun | H04L 5/0064 |
| 2019/0229776 A1 | 7/2019 | Cao | |
| 2019/0246410 A1* | 8/2019 | Zhang | H04L 5/0096 |
| 2020/0022185 A1 | 1/2020 | Luo et al. | |
| 2020/0196254 A1* | 6/2020 | Kerhuel | H04L 1/0051 |
| 2020/0252891 A1* | 8/2020 | Chendamarai Kannan | H04W 72/042 |
| 2021/0045144 A1* | 2/2021 | Kim | H04W 72/23 |
| 2021/0152306 A1* | 5/2021 | Liu | H04L 5/0035 |
| 2021/0167884 A1* | 6/2021 | Chen | H04J 11/0083 |
| 2021/0345269 A1* | 11/2021 | Li | H04W 56/0015 |

FOREIGN PATENT DOCUMENTS

| | | |
|---|---|---|
| CN | 108668366 A | 10/2018 |
| CN | 109104227 A | 12/2018 |
| CN | 109150443 A | 1/2019 |
| EP | 3499749 A1 * 6/2019 | ............... H04J 3/00 |
| WO | 2017/136732 A1 | 8/2017 |
| WO | 2018204260 A1 | 11/2018 |

OTHER PUBLICATIONS

"SS Block Composition and SS Burst Set Composition," 3GPP TSG-RAN WG1 Meeting #89, R1-1708720, Hangzhou, P.R.C., May 15-19, 2017, Agenda Item: 7.1.1.1.2, Source: Ericsson.
"Remaining details on remaining minimum system information delivery," 3GPP TSG RAN WG1#90b,R1-1717578, Hangzhou, P.R.C., May 15-19, 2017, Agenda Item: 7.1.2.2, Source: Samsung.
"On Sync and PBCH-SIB reading in NTN" 3GPP TSG-RAN WG1 Meeting #95, Tdoc R1-1813372, Spokane, USA, Nov. 12-16, 2018, Agenda Item: 7.2.12, Source: Ericsson.
LG Electronics, "Initial access and mobility for NR unlicensed operation", R1-1808508, 3GPP TSG RAN WG1 Meeting #94, Gothenburg, Sweden, Aug. 20-24, 2018, all pages.
International Search Report from PCT/CN2020/075384, dated Apr. 26, 2020, with English translation provided by WIPO, all pages.
Written Opinion of the International Searching Authority from PCT/CN2020/075384, dated Apr. 26, 2020, with English translation provided by WIPO, all pages.
International Preliminary Report on Patentability from PCT/CN2020/075384, dated Aug. 10, 2021, with English translation provided by WIPO, all pages.
First Office Action and Search Report from CN app. No. 201910118061.0, dated Jan. 18, 2021, all pages.

* cited by examiner

SIGNAL SENDING AND RECEIVING METHOD, NETWORK DEVICE AND TERMINAL

CROSS-REFERENCE TO RELATED APPLICATION

The present application is a U.S. national phase application of a PCT Application No. PCT/CN2020/075384 filed on Feb. 14, 2020, which claims priority to Chinese patent application No. 201910118061.0 filed on Feb. 15, 2019, the disclosures of which are incorporated herein by reference in its entirety their entireties.

TECHNICAL FIELD

The present disclosure relates to the field of communication technologies, and in particular, to a signal sending method, a signal receiving method, a network device and a terminal.

BACKGROUND

In satellite communication, user equipment (UE) must be connected to a satellite network through a synchronization process before data transmission between the user equipment and the satellite network. The synchronization process includes cell search and system information reception phases. The satellite sends a synchronization signal, and cell search is a process in which the UE uses the synchronization signal sent by the satellite to perform downlink time and frequency synchronization and obtain a physical cell identity (PCID).

The synchronization signal block (Synchronization Signal/PBCH Block, SSB) design of downlink transmission technology in the related art is not applicable to satellite communication systems. Because satellite systems use a reference signal different from the New Radio (NR) system, the pattern of NR SSB burst set is not applicable to satellite communication systems.

Figure 1A:
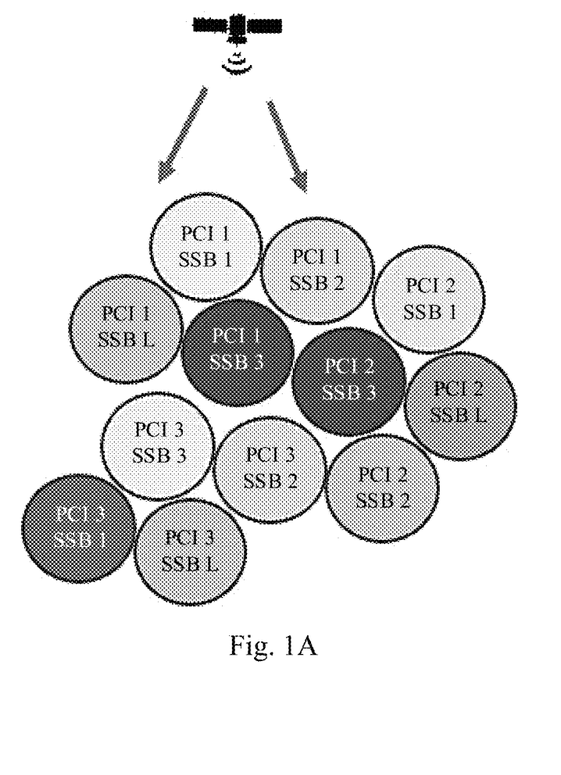
FIG. 1A is a schematic diagram of a relationship between PCIDs and beams.
Figure 1B:
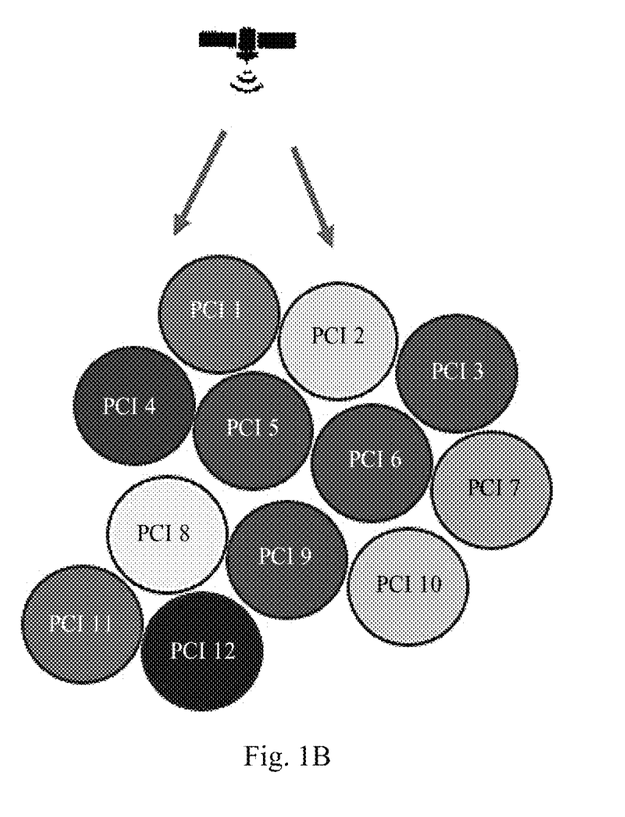
FIG. 1B is another schematic diagram of a relationship between PCIDs and beams.

As shown in FIGS. 1A and 1B, in a satellite communication system, one PCID can cover multiple cells or one cell. If different beams can use a same ID according to FIG. 1A, when beam switching is performed, layer 3 switching is performed, while layer 1 switching is not required; if different beams can use different IDs according to FIG. 1B, when beam switching is performed, layer 1 switching is required.

The satellite system uses beamforming to increase a coverage distance, and uses multiple beams to increase a coverage range. In satellite communication, although one beam covers a large area, because the satellite is moving at a high speed, the beam covering UE will constantly change. This factor needs to be considered when designing a synchronization signal. In order to reduce the complexity of cell handover, the manner shown in FIG. 1B should be used.

Satellite systems experience serious radio channel fading. This factor needs to be considered when designing the synchronization signal.

SUMMARY

Embodiments of the present disclosure provide a signal sending method, a signal receiving method, a network device and a terminal. In view of a satellite communication transmitter's characteristics of strong mobility, severe fading, and high power consumption requirements, a method for transmitting downlink synchronization signal blocks is designed, to maximize the utilization of resources and simultaneously meet the performance requirement of synchronization detection.

In order to solve the above technical problems, an embodiment of the present disclosure provides the following technical solution: a signal sending method. The method is applied to a network device and includes: determining a position and beam direction of a synchronization signal block (SSB) to be sent; sending the SSB according to the determined position and beam direction of the SSB.

Optionally, one SSB burst set includes a preset quantity of repeatedly sent SSBs, and the determining the position of the synchronization signal block SSB to be sent includes: determining a candidate position of a first SSB of the preset quantity of repeatedly sent SSBs in a half frame, such that the candidate position offsets from a start point of the half frame by a fixed N quantity of OFDM symbols, where two adjacent SSBs of the preset quantity of repeatedly sent SSBs are spaced by an interval, N is a positive integer, and there is a correspondence between the value of N and a number of times the SSB is repeatedly sent.

Optionally, the interval is fixed.

Optionally, the interval includes 3 OFDM symbols.

Optionally, the signal sending method further includes: sending remaining minimum system information RMSI, where the RMSI carries indication information of a number of times the SSB is repeatedly sent; or indicating the number of times the SSB is repeatedly sent by using a primary synchronization sequence and/or a secondary synchronization sequence in the SSB.

Optionally, the sending the SSB according to the determined position and beam direction of the SSB includes: sending a same SSB signal in different beam directions, where different beams correspond to different respective frequency resources.

Optionally, broadcast information of the SSB indicates whether there is a beam common reference signal other than a default beam common reference signal in one slot.

An embodiment of the present disclosure further provides a signal receiving method. The method is applied to a terminal, and includes: receiving an SSB sent by a network device in a position and beam direction of the SSB determined by the network device; obtaining, according to the SSB, information of time-frequency synchronization and cell identification.

Optionally, one SSB burst set includes a preset quantity of repeated SSBs, and in a half frame, a candidate position of a first SSB in the preset quantity of repeatedly sent SSBs offsets from a start point of the half frame by a fixed N quantity of orthogonal frequency division multiplexing (OFDM) symbols, two adjacent SSBs of the preset quantity of repeatedly sent SSBs are spaced by an interval, N is a positive integer, and there is a correspondence between the value of N and a number of times the SSB is repeatedly sent.

Optionally, the interval is fixed.

Optionally, the interval includes 3 OFDM symbols.

Optionally, the signal receiving method further includes: receiving remaining minimum system information RMSI, where the RMSI carries indication information of the number of times the SSB is repeatedly sent; or obtaining the number of times the SSB is repeatedly sent through a primary synchronization sequence and/or a secondary synchronization sequence in the SSB; or obtaining the number of times the SSB is repeatedly sent through blind detection.

Optionally, receiving an SSB sent by a network device in a position and beam direction of the SSB determined by the network device includes: receiving a same SSB signal in different beam directions, and different beams correspond to different respective frequency resources.

Optionally, the signal receiving method further includes: obtaining, through broadcast information of the SSB, a beam common reference signal other than a default beam common reference signal contained in one slot.

An embodiment of the present disclosure further provides a network device, including: a processor, a transceiver, and a memory storing therein a program executable by the processor, when the processor executes the program, the following step is implemented: determining a position and beam direction of a synchronization signal block SSB to be sent; the transceiver is configured to send the SSB according to the determined position and beam direction of the SSB.

Optionally, one SSB burst set includes a preset quantity of repeatedly sent SSBs, and determining the position of the synchronization signal block SSB to be sent includes: determining a candidate position of a first SSB of the preset quantity of repeatedly sent SSBs in a half frame, such that the candidate position offsets from a start point of the half frame by a fixed N quantity of OFDM symbols, where two adjacent SSBs of the preset quantity of repeatedly sent SSBs are spaced by an interval, N is a positive integer, and there is a correspondence between the value of N and a number of times the SSB is repeatedly sent.

Optionally, the interval is fixed.

Optionally, the interval includes 3 OFDM symbols.

Optionally, the transceiver is further configured to: send remaining minimum system information (RMSI), where the RMSI carries indication information of a number of times the SSB is repeatedly sent; or indicate the number of times the SSB is repeatedly sent by using a primary synchronization sequence and/or a secondary synchronization sequence in the SSB.

Optionally, the transceiver sends a same SSB signal in different beam directions, and different beams correspond to different respective frequency resources.

Optionally, broadcast information of the SSB indicates whether there is a beam common reference signal other than a default beam common reference signal in one slot.

An embodiment of the present disclosure further provides a network device, including: a processing module, configured to determine a position and beam direction of a synchronization signal block SSB to be sent; a transceiving module, configured to send the SSB according to the determined position and beam direction of the SSB.

An embodiment of the present disclosure further provides a terminal, including: a processor, a transceiver and a memory storing therein a program executable by the processor; where the transceiver is configured to receive an SSB sent by a network device in a position and beam direction of the SSB determined by the network device; when the processor executes the program, the following step is implemented: obtaining, according to the SSB, information of time-frequency synchronization and cell identification.

Optionally, one SSB burst set includes a preset quantity of repeated SSBs, and in a half frame, a candidate position of a first SSB in the preset quantity of repeatedly sent SSBs offsets from a start point of the half frame by a fixed N quantity of orthogonal frequency division multiplexing (OFDM) symbols, two adjacent SSBs of the preset quantity of repeatedly sent SSBs are spaced by an interval, N is a positive integer, and there is a correspondence between the value of N and a number of times the SSB is repeatedly sent.

Optionally, the interval is fixed.

Optionally, the interval includes 3 OFDM symbols.

Optionally, the transceiver is further configured to: receive remaining minimum system information (RMSI), where the RMSI carries indication information of a number of times the SSB is repeatedly sent; or obtain the number of times the SSB is repeatedly sent through a primary synchronization sequence and/or a secondary synchronization sequence in the SSB; or obtain the number of times the SSB is repeatedly sent through blind detection.

Optionally, the transceiver receives a same SSB signal in different beam directions, and different beams correspond to different respective frequency resources.

Optionally, broadcast information of the SSB indicates whether there is a beam common reference signal other than a default beam common reference signal in one slot.

An embodiment of the present disclosure further provides a terminal, including: a transceiving module, configured to receive an SSB sent by a network device in a position and beam direction of the SSB determined by the network device; a processing module, configured to obtain information of time-frequency synchronization and cell identification according to the SSB.

An embodiment of the present disclosure further provides a computer storage medium including instructions, where the instructions, when executed by a processor, cause the processor to implement the methods as described above.

The beneficial effects of the embodiments of the present disclosure are: in the above-mentioned embodiments of the present disclosure, the position and beam direction of the synchronization signal block SSB to be sent are determined; and the SSB is sent according to the determined position and beam direction of the SSB. In view of a satellite communication transmitter's characteristics of strong mobility, severe fading, and high power consumption requirements, a method for transmitting downlink synchronization signal blocks is designed, to maximize the utilization of resources and simultaneously meet the performance requirement of synchronization detection.

DETAILED DESCRIPTION

Hereinafter, the exemplary embodiments of the present disclosure are described in detail with reference to the accompanying drawings. Although the exemplary embodiments of the present disclosure are illustrated in the accompanying drawings, the present disclosure may, however, be embodied in many different forms and should not be construed as being limited to the embodiments set forth herein. Rather, these embodiments are provided so that the present disclosure will be thorough, and will fully convey the scope of the present disclosure to those skilled in the art.

Figure 2:
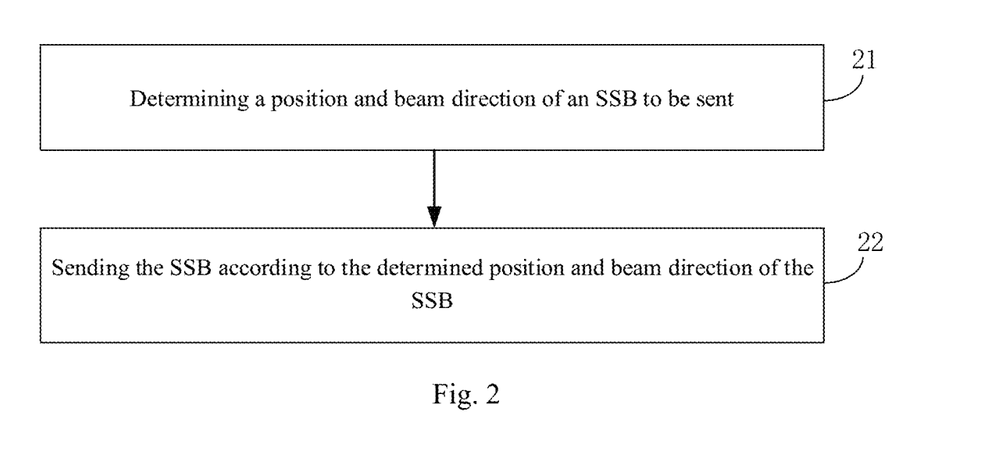
FIG. 2 is a flowchart of a signal sending method on a network device side according to an embodiment of the present disclosure.

As shown in FIG. 2, an embodiment of the present disclosure further provides a signal sending method. The method is performed by a network device, and includes step 21 and step 22.

Step 21, determining a position and beam direction of a synchronization signal block (SSB) to be sent.

Step 22, sending the SSB according to the determined position and beam direction of the SSB.

In this embodiment of the present disclosure, the position and beam direction of the synchronization signal block SSB to be sent are determined; and the SSB is sent according to the determined position and beam direction of the SSB. In view of a satellite communication transmitter's characteristics of strong mobility, severe fading, and high power consumption requirements, a method for transmitting downlink synchronization signal blocks is designed, to maximize the utilization of resources and simultaneously meet the performance requirement of synchronization detection.

Figure 3:
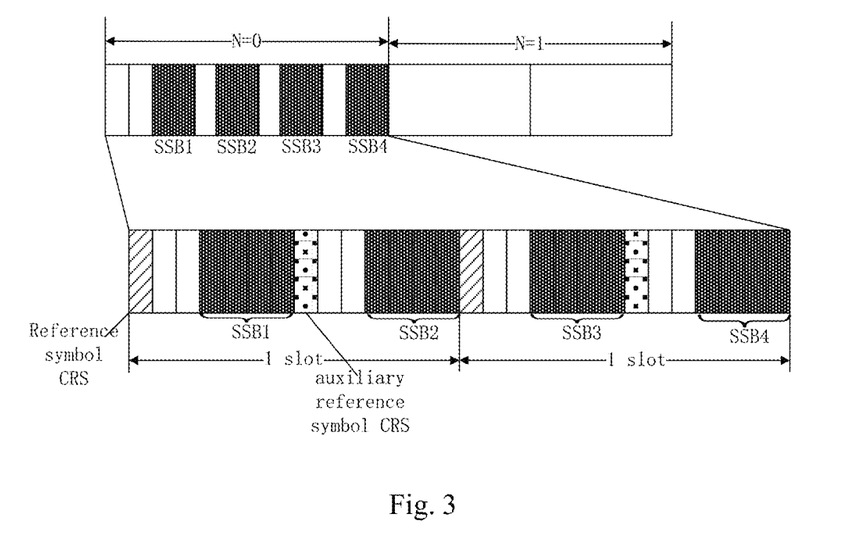
FIG. 3 is an example of a design pattern of an SSB burst set.

As shown in FIG. 3, a pattern of an SSB burst set, that is, positions of SSBs in a half frame, is illustrated. One SSB burst set includes a preset quantity of repeatedly sent SSBs, and the preset quantity is a multiple of 2. For example, there are 4 repeated SSB burst blocks. The SSBs on all beams are configured with the same time domain resource.

In the above embodiment, the determining the position of the synchronization signal block SSB to be sent includes: determining a candidate position of a first SSB of the preset quantity of repeatedly sent SSBs in a half frame, such that the candidate position offsets from a start point of the half frame by a fixed N quantity of OFDM symbols, where two adjacent SSBs of the preset quantity of repeatedly sent SSBs are spaced by an interval, N is a positive integer, and there is a correspondence between the value of N and a number of times the SSB is repeatedly sent.

There is a fixed interval between two adjacent SSBs of the preset quantity of repeatedly sent SSBs. The interval includes 3 OFDM symbols.

Specifically, in this embodiment, the DFT-s-OFDM symbol index values of the candidate positions of the SSB relative to the start point of the half frame in the SSB half frame are provided.

A specific position example of one pattern is as shown in the following table, and a specific schematic diagram of a pattern is shown in FIG. 3. In the satellite system, the symbol 0 of each slot is a reference symbol, and the symbol 8 of each slot is an auxiliary reference symbol. The initial several symbols are reserved for the downlink control channel, and only symbols other than the initial several symbols can be used for SSB transmission.

TABLE 1

| | DFT-s-OFDM symbol index values of the first symbols of SSBs in a half frame | |
|---|---|---|
| Mode | SSB SCS (kHz) | OFDM symbol index values of the first symbols of SSBs in a half frame |
| A | 120 | {3, 10, 17, 24} |
| B | 240 | {3, 10, 17, 24} |
| C | 480 | {3, 10, 17, 24} |

One SSB burst set includes several repeated SSB burst blocks (sent in one half frame), and the quantity of SSB burst blocks may be a multiple of 2, for example, 4 repeated SSB burst blocks. All cells can use the same time-frequency domain resources.

In the foregoing embodiment of the present disclosure, the SSB includes: a primary synchronization signal (PSS), a secondary synchronization signal (SSS), and a physical broadcast channel (PBCH); each of the PSS and SSS occupies one DFT-s-OFDM symbol; the PBCH channel occupies two DFT-s-OFDM symbols; the PSS and SSS each occupy 12 physical resource blocks (PRBs) in the frequency domain; the PBCH channel occupies 20 PRBs in the frequency domain.

In an embodiment of the present disclosure, the foregoing method may further include:

step 23, sending remaining minimum system information (RMSI), where the RMSI carries indication information of a number of times the SSB is repeatedly sent; or step 24, indicating the number of times the SSB is repeatedly sent by using a primary synchronization sequence and/or a secondary synchronization sequence in the SSB.

Specifically, a process of notifying the number of times the SSB is repeatedly sent based on relative positions of SSBs in a slot is as shown in the following table:

| quantity of repetitions | SSB SCS (kHz) | OFDM symbol index values of the first symbols of SSBs in a half frame |
|---|---|---|
| 4/8 (2/8) | 120 | {3, 10, 17, 24} |
| 1/2 (1/4) | 120 | {2, 9, 16, 23} |
| 2 | 120 | {1, 8, 15, 22} |

By detecting CRS and SSB sequences, UE determines which one of 1, 2, 4, and 8 is the quantity of repetitions.

Optionally, since the UE blind detection may not be able to correctly detect the number of times the SSB is repeated, the actual quantity of repeatedly sent SSBs is indicated in the RMSI (Remaining minimum system information). There are two bits corresponding to 4 states, to indicate which one of 1, 2, 4, and 8 is the quantity of the repeated transmission.

Optionally, a synchronization sequence may be used to indicate the repetition quantity of the synchronization block. For example, PSS can indicate 3 sequences, and the 3 sequences correspond to three repetition quantities of SSB respectively.

If SSS is used to indicate the repetition quantity of SSB block, the SSS sequences are grouped, and different groups correspond to different respective repetition quantities of SSB.

If PSS and SSS are used to indicate the repetition quantity of SSB block, the PSS and SSS sequences are grouped, and different groups correspond to different respective repetition quantities of SSB.

Indicating the repetition quantity of SSB through the PSS and/or SSS can facilitate the combined detection of the PBCH and improve the detection accuracy.

In the embodiment of the present disclosure, in the above step 22, sending the SSB according to the determined position and beam direction of the SSB includes: sending a same SSB signal in different beam directions, where different beams correspond to different respective frequency resources.

Broadcast information (PBCH) of the SSB indicates a quantity of beam common reference signals.

In the above embodiments of the present disclosure, the network device determines configuration information and beam direction of an SSB to be sent, notifies the number of times the SSB is repeatedly sent, and configures a same time domain position for SSBs in different satellite beam directions; different satellite beams correspond to different respective frequency resources, a relative frequency domain position of SSB in a bandwidth occupied by a beam remains fixed; SSB signals of different satellite beam directions are repeatedly sent in one SSB burst; PBCH does not contain demodulation reference signal in one SSB, the demodulation reference signal of PBCH depends on the beam common reference signal; adjacent beams use different frequency resources to reduce interference and use the same PCI, the synchronization signal sequence is generated based on the same PCI, but contents of the broadcast information are different, and are associated with different cells. The number of times the SSB is repeatedly sent is indicated based on the position of the synchronization signal or the sequence of the synchronization signal; the broadcast channel PBCH is used to indicate additional system information; the broadcast channel indicates sequence numbers of SSBs in repeated transmission; the broadcast channel indicates whether there are additional beam common reference signals (CRSs).

Figure 4:
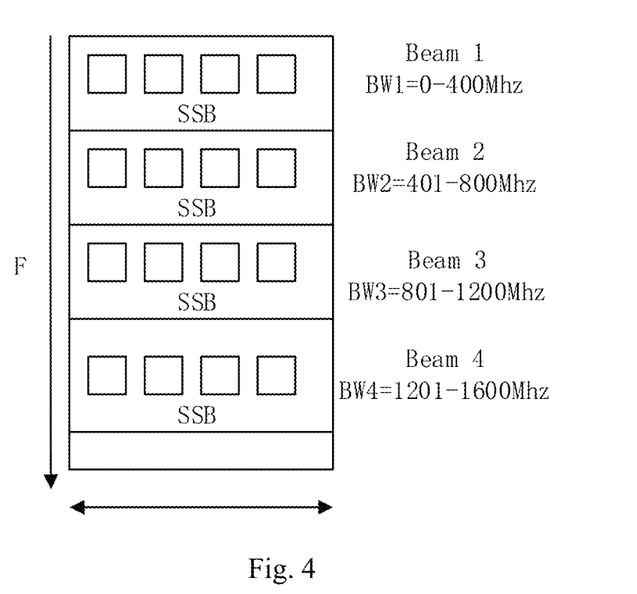
FIG. 4 is a schematic diagram of a correspondence between beams and SSBs.
Figure 5:
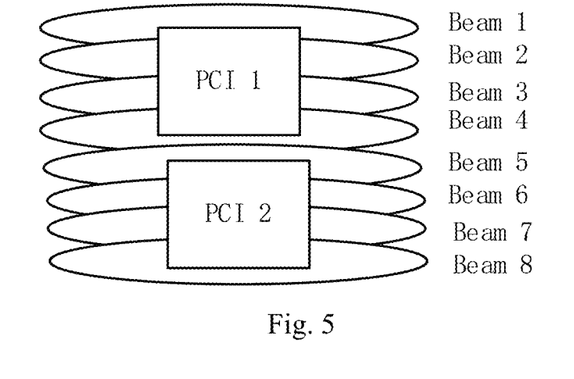
FIG. 5 is a schematic diagram of a correspondence between beams and PCIs.

In a specific embodiment of the present disclosure, as shown in FIG. 4 and FIG. 5, FIG. 4 illustrates a correspondence relationship between SSBs and beams, and FIG. 5 illustrates a correspondence relationship between different beams and PCIs. Usually a satellite carries 16 beams. 4 adjacent beams can be configured with a same PCID, but the 4 beams correspond to different bandwidths. As shown in FIG. 4 and FIG. 5, each beam corresponds to a bandwidth of 400 Mhz, and the 4 beams actually correspond to 4 different cells due to different center frequency. Since the PCI is the same, synchronization signal sequences of different beams are generated according to the same PCI. For UE in an RRC-Connected state, UE performs BWP switching between different beams. For UE in an RRC-IDLE state, UE may select different beams to access.

In the embodiments of the present disclosure, when multiple SSBs are repeatedly transmitted, the broadcast channel PBCH can indicate the sequence numbers of SSBs in the repeated transmission, to help the terminal to quickly obtain synchronization and system information.

Meanwhile, in the case that a quantity of symbols of the beam common reference signal is configurable, symbol 0 is a default CRS symbol position, symbol 7 is an additional CRS symbol position, and the information field of the broadcast channel can indicate whether there is an additional beam common reference signal (CRS) symbol.

In the above embodiment of the present disclosure, the position and beam direction of the synchronization signal block SSB to be sent are determined; and the SSB is sent according to the determined position and beam direction of the SSB. In view of a satellite communication transmitter's characteristics of strong mobility, severe fading, and high power consumption requirements, a method for transmitting downlink synchronization signal blocks is designed, to maximize the utilization of resources and simultaneously meet the performance requirement of synchronization detection.

Figure 6:
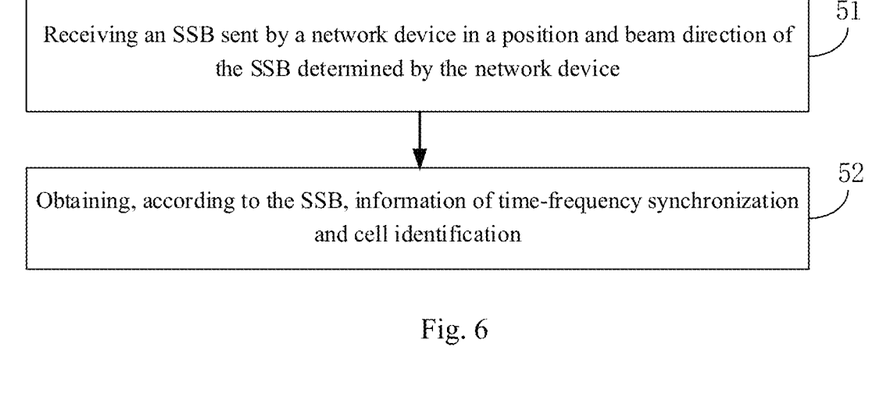
FIG. 6 is a flowchart of a signal receiving method on a terminal side according to an embodiment of the present disclosure.

As shown in FIG. 6, an embodiment of the present disclosure further provides a signal receiving method. The method is performed by a terminal and includes a step 51 and a step 52.

Step 51, receiving an SSB sent by a network device in a position and beam direction of the SSB determined by the network device.

Step 52, obtaining, according to the SSB, information of time-frequency synchronization and cell identification.

Optionally, one SSB burst set includes a preset quantity of repeatedly sent SSBs, and in a half frame, a candidate position of a first SSB in the preset quantity of repeatedly sent SSBs offsets from a start point of the half frame by a fixed N quantity of orthogonal frequency division multiplexing (OFDM) symbols, two adjacent SSBs of the preset quantity of repeatedly sent SSBs are spaced by an interval, where N is a positive integer, and there is a correspondence between the value of N and a number of times the SSB is repeatedly sent.

Optionally, the interval is fixed.

Optionally, the interval includes 3 OFDM symbols.

Optionally, the receiving method further includes:

receiving remaining minimum system information (RMSI), where the RMSI carries indication information of a number of times the SSB is repeatedly sent; or obtaining, through a primary synchronization sequence and/or a secondary synchronization sequence in the SSB, the number of times the SSB is repeatedly sent; or obtaining, through blind detection, the number of times the SSB is repeatedly sent.

Optionally, receiving an SSB sent by a network device in a position and beam direction of the SSB determined by the network device includes: receiving a same SSB signal in different beam directions, and different beams correspond to different respective frequency resources.

The above signal receiving method of the present disclosure may further include: obtaining, through broadcast information of the SSB, a beam common reference signal, other than a default beam common reference signal, in one slot.

In this embodiment of the present disclosure, an SSB sent by a network device is received in a position and beam direction of the SSB determined by the network device; information of time-frequency synchronization and cell identification are obtained according to the SSB. In view of a satellite communication transmitter's characteristics of strong mobility, severe fading, and high power consumption requirements, a method for transmitting downlink synchronization signal blocks is designed, to maximize the utilization of resources and simultaneously meet the performance requirement of synchronization detection.

Figure 7:
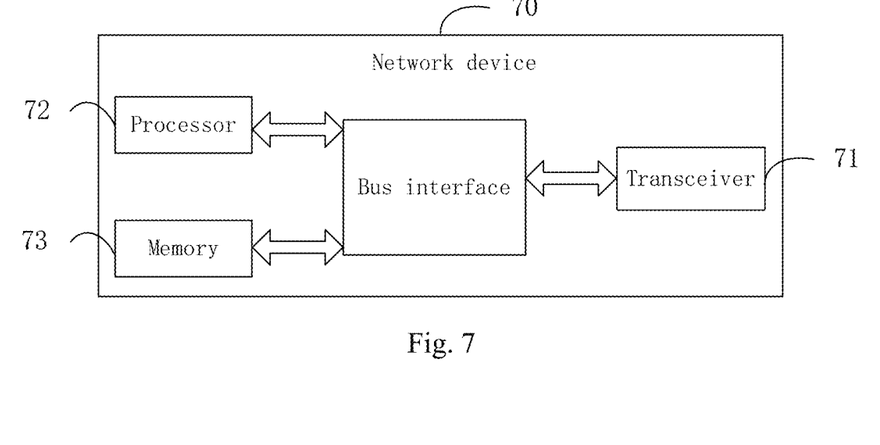
FIG. 7 is a schematic structural diagram of a network device according to an embodiment of the present disclosure.

As shown in FIG. 7, an embodiment of the present disclosure further provides a network device 70, including: a processor 72, a transceiver 71, and a memory 73. The memory 73 stores a program executable by the processor 72. When the processor 72 executes the program, the following step is implemented: determining a position and beam direction of an SSB to be sent; and the transceiver sends the SSB according to the determined position and beam direction of the SSB.

Optionally, one SSB burst set includes a preset quantity of repeatedly sent SSBs, and determining the position of the SSB to be sent includes:

determining a candidate position of a first SSB of the preset quantity of repeatedly sent SSBs in a half frame, such that the candidate position offsets from a start point of the half frame by a fixed N quantity of OFDM symbols, where two adjacent SSBs of the preset quantity of repeatedly sent SSBs are spaced by an interval, N is a positive integer, and there is a correspondence between the value of N and a number of times the SSB is repeatedly sent.

Optionally, the interval is fixed.

Optionally, the interval includes 3 OFDM symbols.

Optionally, the transceiver is further configured to: send remaining minimum system information (RMSI), the RMSI carries indication information of a number of times the SSB is repeatedly sent; or indicate the number of times the SSB is repeatedly sent by using a primary synchronization sequence and/or a secondary synchronization sequence in the SSB.

Optionally, the transceiver sends a same SSB signal in different beam directions, and different beams correspond to different respective frequency resources.

Optionally, broadcast information of the SSB indicates whether there is a beam common reference signal other than a default beam common reference signal in one slot.

It should be noted that the network device is a network device corresponding to the method as shown in FIG. 2, and all implementations of the foregoing method embodiment are applicable to the embodiments of the network device, and can achieve the same technical effect. The transceiver 71 and the processor 72, as well as the transceiver 71 and the memory 73, can be connected through a bus interface. The functions of the transceiver 71 can be implemented by the processor 72, and the functions of the processor 72 can also be implemented by the transceiver 71.

An embodiment of the present disclosure further provides a network device, including:

a processing module, configured to determine a position and beam direction of an SSB to be sent;

a transceiving module, configured to send the SSB according to the determined position and beam direction of the SSB.

Optionally, one SSB burst set includes a preset quantity of repeatedly sent SSBs, and determining the position of the SSB to be sent includes:

determining a candidate position of a first SSB of the preset quantity of repeatedly sent SSBs in a half frame, such that the candidate position offsets from a start point of the half frame by a fixed N quantity of OFDM symbols, where two adjacent SSBs of the preset quantity of repeatedly sent SSBs are spaced by an interval, N is a positive integer, and there is a correspondence between the value of N and a number of times the SSB is repeatedly sent.

Optionally, the interval is fixed.

Optionally, the interval includes 3 OFDM symbols.

Optionally, the transceiver is further configured to: send remaining minimum system information (RMSI), where the RMSI carries indication information of a number of times the SSB is repeatedly sent; or indicate the number of times the SSB is repeatedly sent by using a primary synchronization sequence and/or a secondary synchronization sequence in the SSB.

Optionally, the transceiver sends a same SSB signal in different beam directions, and different beams correspond to different respective frequency resources.

Optionally, broadcast information of the SSB indicates whether there is a beam common reference signal other than a default beam common reference signal in one slot.

It should be noted that the network device is a network device corresponding to the method as shown in FIG. 2, and all implementations of the foregoing method embodiment are applicable to the embodiments of the network device, and can achieve the same technical effect.

Figure 8:
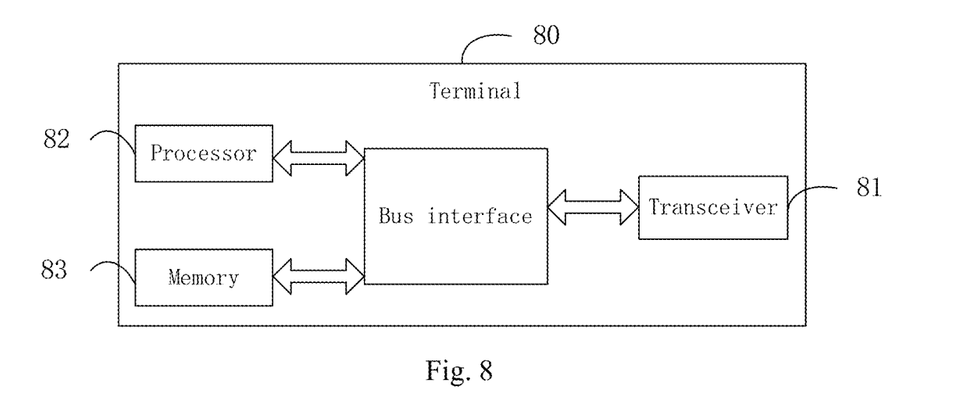
FIG. 8 is a schematic structural diagram of a terminal according to an embodiment of the present disclosure.

As shown in FIG. 8, an embodiment of the present disclosure further provides a terminal 80, including: a processor 82, a transceiver 81 and a memory 83; the transceiver 81 is configured to receive an SSB sent by a network device in a position and beam direction of the SSB determined by the network device; the memory 83 stores a program executable by the processor 82, and when the processor executes the program, the following step is implemented: obtaining, according to the SSB, information of time-frequency synchronization and cell identification.

Optionally, one SSB burst set includes a preset quantity of repeated SSBs, and in a half frame, a candidate position of a first SSB in the preset quantity of repeatedly sent SSBs offsets from a start point of the half frame by a fixed N quantity of orthogonal frequency division multiplexing (OFDM) symbols, two adjacent SSBs of the preset quantity of repeatedly sent SSBs are spaced by an interval, where N is a positive integer, and there is a correspondence between the value of N and a number of times the SSB is repeatedly sent.

Optionally, the interval is fixed.

Optionally, the interval includes 3 OFDM symbols.

Optionally, the transceiver is further configured to: receive remaining minimum system information (RMSI), where the RMSI carries indication information of a number of times the SSB is repeatedly sent; or obtain, through a primary synchronization sequence and/or a secondary synchronization sequence in the SSB, the number of times the SSB is repeatedly sent; or obtain, through blind detection, the number of times the SSB is repeatedly sent.

Optionally, the transceiver receives a same SSB signal in different beam directions, and different beams correspond to different respective frequency resources.

Optionally, broadcast information of the SSB indicates whether there is a beam common reference signal other than a default beam common reference signal in one slot.

It should be noted that the terminal is a terminal corresponding to the method as shown in FIG. 6, and all implementations of the foregoing method embodiment are applicable to the embodiments of the terminal, and can achieve the same technical effect. The transceiver 81 and the processor 82, as well as the transceiver 81 and the memory 83, can be connected through a bus interface. The functions of the transceiver 81 can be implemented by the processor 82, and the functions of the processor 82 can also be implemented by the transceiver 81.

An embodiment of the present disclosure further provides a terminal, including:

a transceiving module, configured to receive an SSB sent by a network device in a position and beam direction of the SSB determined by the network device;

a processing module, configured to obtain information of time-frequency synchronization and cell identification according to the SSB.

Optionally, one SSB burst set includes a preset quantity of repeated SSBs, and in a half frame, a candidate position of a first SSB in the preset quantity of repeatedly sent SSBs offsets from a start point of the half frame by a fixed N quantity of orthogonal frequency division multiplexing (OFDM) symbols, two adjacent SSBs of the preset quantity of repeatedly sent SSBs are spaced by an interval, N is a positive integer, and there is a correspondence between the value of N and a number of times the SSB is repeatedly sent.

Optionally, the interval is fixed.

Optionally, the interval includes 3 OFDM symbols.

Optionally, the transceiver is further configured to: receive remaining minimum system information (RMSI), where the RMSI carries indication information of a number of times the SSB is repeatedly sent; or obtain, through a primary synchronization sequence and/or a secondary synchronization sequence in the SSB, the number of times the SSB is repeatedly sent; or obtain, through blind detection, the number of times the SSB is repeatedly sent.

Optionally, the transceiver receives a same SSB signal in different beam directions, and different beams correspond to different respective frequency resources.

Optionally, broadcast information of the SSB indicates whether there is a beam common reference signal other than a default beam common reference signal in one slot.

It should be noted that the terminal is a terminal corresponding to the method as shown in FIG. 6, and all implementations of the foregoing method embodiment are applicable to the embodiments of the terminal, and can achieve the same technical effect.

An embodiment of the present disclosure further provides a computer storage medium including instructions, where the instructions, when executed by a computer, cause the computer to implement the method as shown in FIG. 2 or FIG. 6. The methods as shown in FIG. 3 to FIG. 5 are also applicable to this embodiment, and can achieve the same technical effects.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the function is implemented in the form of a software functional unit, and sold or used as a standalone product, the function may be stored in a computer-readable storage medium. Based on this understanding, essence of the technical solution of the antenna multiplexing of the present disclosure, or the part contributing to the prior art, or part of the technical solution, can be embodied in the form of a computer software product. The computer software product is stored in a storage media, and the computer software product comprises a number of instructions to enable a computer device (which may be a personal computer, server, or network device, etc.) to perform all or part of the steps of the method described in the various embodiments of the present disclosure. The storage medium comprises a USB disk, a removable hard disk, a read-only memory (ROM), a random access memory (RAM), a magnetic disk, an optical disc, and other medium which can store program code.

It may be understood that these embodiments described in this disclosure may be implemented by hardware, software, firmware, middleware, microcode or a combination thereof. For hardware implementation, a processing unit may be implemented in one or more ASICs, a DSP, a DSP device (DSPD), a programmable logic device (PLD), a field-programmable gate array (FPGA), a general-purpose processor, a controller, a microcontroller, a microprocessor, other electronic unit configured to perform the functions in the present disclosure or a combination thereof.

For a software implementation, the techniques in some embodiments of the present disclosure may be implemented by modules (for example, processes or functions) performing the functions described in some embodiments of the present disclosure. Software codes may be stored in a storage and executed by a processor. The storage may be implemented internal or external to a processor.

In addition, it should be noted that in the apparatus and the method of the present disclosure, apparently, parts or steps may be divided and/or re-combined. The divisions and/or re-combinations should be regarded as equivalent solutions of the present disclosure. Moreover, steps of the above series of processes may be performed naturally in a time order of description. However, the performing sequence is not limited to the time order. Some steps may be performed in parallel or independently. Persons of ordinary skill in the art would appreciate that all or any steps or parts of the methods and apparatuses of the present disclosure may be implemented in any computing apparatus (including a processor, a storage medium or the like) or a network of computing apparatuses in hardware, firmware, software or a combination thereof, and this can be achieved by persons of ordinary skill in the art by using their basic programming skill after reading the description of the present disclosure.

Thus, the object of the present disclosure may also be implemented by running a program or a set of programs on any computing apparatus. The computing apparatus may be a known general purpose apparatus. Thus, the object of the present disclosure may also be implemented merely by providing a program product which contains program code for implementing the methods or apparatuses. That is, such program product also constitutes the present disclosure, and a storage medium in which such a program product is stored also constitutes the present disclosure. Apparently, the storage medium may be any known storage medium or any storage medium that will be developed in the future. It should also be noted that, in the apparatuses and methods of the present disclosure, apparently, parts or steps may be divided and/or re-combined. The divisions and/or re-combinations should be regarded as equivalent solutions of the present disclosure. Moreover, steps of the foregoing series of processes may be performed naturally in a time order of description, however the performing sequence is not limited to the time order. Some steps may be performed in parallel or independently.

The foregoing describes optional implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A signal sending method, comprising:
    determining a position and beam direction of a synchronization signal block (SSB) to be sent;
    sending the SSB according to the determined position and beam direction of the SSB;
    wherein, one SSB burst set comprises a preset quantity of repeatedly sent SSBs, and the determining the position of the SSB to be sent comprises:
    determining a candidate position of a first SSB of the preset quantity of repeatedly sent SSBs in a half frame, such that the candidate position offsets from a start point of the half frame by a fixed N quantity of orthogonal frequency division multiplexing (OFDM) symbols, wherein two adjacent SSBs of the preset quantity of repeatedly sent SSBs are spaced by 3 OFDM symbols, N is a positive integer, and there is a correspondence between a value of N and a number of times the SSB is repeatedly sent, the number of times the SSB is repeatedly sent is obtained by the value of N;
    wherein the sending the SSB according to the determined position and beam direction of the SSB comprises:
    sending a same SSB signal in different beam directions, wherein different beams correspond to different respective frequency resources.

2. The signal sending method according to claim 1, further comprising:
    sending remaining minimum system information (RMSI), wherein the RMSI carries indication information of the number of times the SSB is repeatedly sent; or
    indicating the number of times the SSB is repeatedly sent by using a primary synchronization sequence and/or a secondary synchronization sequence in the SSB.

3. The signal sending method according to claim 1, wherein broadcast information of the SSB indicates whether there is a beam common reference signal other than a default beam common reference signal in one slot.

4. A signal receiving method, comprising:
    receiving a synchronization signal block (SSB) sent by a network device in a position and beam direction of the SSB determined by the network device;
    obtaining, according to the SSB, information of time-frequency synchronization and cell identification;
    wherein one SSB burst set comprises a preset quantity of repeatedly sent SSBs, and in a half frame, a candidate position of a first SSB in the preset quantity of repeatedly sent SSBs offsets from a start point of the half frame by a fixed N quantity of orthogonal frequency division multiplexing (OFDM) symbols, two adjacent SSBs of the preset quantity of repeatedly sent SSBs are spaced by 3 OFDM symbols, N is a positive integer, and there is a correspondence between a value of N and a number of times the SSB is repeatedly sent, the number of times the SSB is repeatedly sent is obtained by the value of N;
    wherein the receiving the SSB sent by the network device in the position and beam direction of the SSB determined by the network device comprises:
    receiving a same SSB signal in different beam directions, wherein different beams correspond to different respective frequency resources.

5. The signal receiving method according to claim 4, further comprising:
    receiving remaining minimum system information (RMSI), wherein the RMSI carries indication information of the number of times the SSB is repeatedly sent; or
    obtaining, through a primary synchronization sequence and/or a secondary synchronization sequence in the SSB, the number of times the SSB is repeatedly sent; or
    obtaining, through blind detection, the number of times the SSB is repeatedly sent.

6. The signal receiving method according to claim 4, further comprising:
    obtaining, through broadcast information of the SSB, a beam common reference signal other than a default beam common reference signal in one slot.

7. A network device, comprising: a processor, a transceiver, and a memory storing therein a program executable by the processor, wherein when the processor executes the program, following step is implemented: determining a position and beam direction of a synchronization signal block (SSB) to be sent;
    the transceiver is configured to send the SSB according to the determined position and beam direction of the SSB;
    wherein, one SSB burst set comprises a preset quantity of repeatedly sent SSBs, and when the processor executes the program, following step is further implemented:
    determining a candidate position of a first SSB of the preset quantity of repeatedly sent SSBs in a half frame, such that the candidate position offsets from a start point of the half frame by a fixed N quantity of OFDM symbols, wherein two adjacent SSBs of the preset quantity of repeatedly sent SSBs are spaced by 3 OFDM symbols, N is a positive integer, and there is a correspondence between a value of N and a number of times the SSB is repeatedly sent, the number of times the SSB is repeatedly sent is obtained by the value of N;
    wherein the transceiver further is configured to send a same SSB signal in different beam directions, wherein different beams correspond to different respective frequency resources.

8. A terminal, comprising: a processor, a transceiver, and a memory storing therein a program executable by the processor, wherein,
    when the processor executes the program, the method according to claim 4 is implemented.

* * * * *